No. 852,334.

R. W. LEWIS.
CHECK VALVE.
APPLICATION FILED JAN. 25, 1906.

PATENTED APR. 30, 1907.

Witnesses

Inventor
R. W. Lewis
By
Attorneys

UNITED STATES PATENT OFFICE.

RAYMOND W. LEWIS, OF FINDLAY, OHIO.

CHECK-VALVE.

No. 852,334.      Specification of Letters Patent.      Patented April 30, 1907.

Application filed January 25, 1906. Serial No. 297,829.

*To all whom it may concern:*

Be it known that I, RAYMOND W. LEWIS, a citizen of the United States, residing at Findlay, in the county of Hancock, State of Ohio, have invented certain new and useful Improvements in Check-Valves; and I do hereby declare the following to be a full, clear, and exact description of the invention, such as will enable others skilled in the art to which it appertains to make and use the same.

This invention has relation to check-valves generally, and while it may be applied to feed-water heaters its use is not limited to connection with any particular device or devices or apparatus, but may be employed wherever it may be applicable or desirable.

It is the object of the invention to provide a check-valve that may be simple in construction and economical of manufacture and use, while being serviceable to a maximum extent.

The nature of the invention embodies, among other things, a short tube or "union" inclosing a valve, preferably of the "cage" type that is adapted to move to a limited extent in the union which is provided internally with a stop for the legs or standards of the valve and provided at one end with an internal screw-thread that is adapted to engage an externally screw-threaded plug provided with a valve seat and internal screw thread, if desired, for the attachment of a supply pipe thereto.

Figure 1:
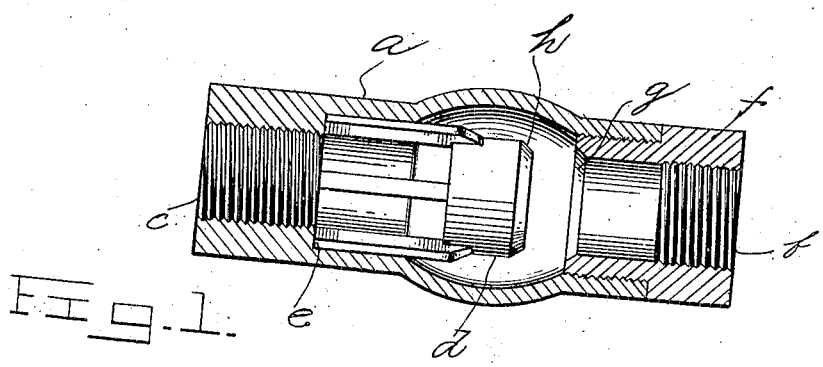
Figure 2:
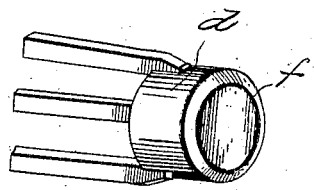

The drawings attached hereto form a part of this specification and are to be referred to as such, the said drawings showing in Figure 1 a longitudinal section through the valve casing with the valve in elevation. Fig. 2 is a perspective view of the valve.

Similar letters of reference designate similar parts or features, as the case may be, wherever they occur.

In carrying out my invention I provide a section of pipe $a$ which may constitute a substantial union between a receiving conduit and means, as a boiler, barrel, or the like, to be served.

$b$ designates the inlet and $c$ the outlet.

$d$ designates the valve, here shown to be of the cage kind or type. The offset $e$ in the interior of the pipe will answer as a stop for the legs of the valve when open, and the end of the externally screw-threaded insertible part of the plug $f$ will be provided with a nicely ground valve seat $g$ upon which the correspondingly constructed valve $h$ proper may be seated.

The interior of the end of the pipe to receive the plug $f$ will be formed with a screw-thread corresponding in size, pitch, &c., to the external screw-thread formed on the insertible part of the plug $f$ so that after the valve is placed in the union $a$ the plug can be screwed home, and the union can be attached to a receiving pipe at one end, and a discharge pipe at the other. It may be connected with a feed water mechanism of a steam boiler so that when the pump is turned on the valve will leave its seat and thus automatically open for the water to pass in the port $b$ and discharge through the port $c$ to the boiler, and when the pump is "shut off" the back pressure of the water from the boiler will close the valve securely on its seat in a way well known. The portion of the pipe $a$ in which the valve operates will be "bulged out" to give ample room for the valve to work, while the portions opposite both ends of the valve may be smaller as shown.

Among the advantages of my invention, in addition to those already recited, may be stated as follows: The device can be made of good malleable iron or galvanized iron and produce the same work and subserve its purposes as well as though it were made of brass. It can be placed in any position without affecting its efficacy, and will work equally well in steam, water, or oil, or other liquids. It is exceedingly simple in construction, and economical of manufacture, as well as being adapted to have its parts quickly assembled. The valve is entirely guided at its rear end, the forward end being free of guiding or other means. Should any one of the parts give out or become impaired, that single part only need be renewed to completely repair the device.

I claim:—

A three part check valve comprising a casing including a central enlarged portion and reduced cylindrical end portions, one of said end portions having the outer portion of its bore internally threaded to receive a pipe and having the inner portion of its bore enlarged and forming a guide, there being a resultant shoulder between the reduced and enlarged portions of the bore, a valve comprising a body portion within the central portion of the casing and integral fingers slidably fitting in said guide and adapted to rest against said shoulder when the valve is open, and a short tube section screwed into the opposite end portion of the casing and having a valve seat formed at its inner end to receive said valve in its closed position and having its outer end internally threaded to receive a pipe, the valve being removable through one end of the casing when the valve seat is disengaged.

In testimony whereof, I affix my signature, in presence of two witnesses.

RAYMOND W. LEWIS.

Witnesses:
R. D. COLE,
JOHN J. COLE.